[19] United States Patent
Vestal
[11] Patent Number: 4,731,533
[45] Date of Patent: Mar. 15, 1988

[54] METHOD AND APPARATUS FOR DISSOCIATING IONS BY ELECTRON IMPACT

[75] Inventor: Marvin L. Vestal, Houston, Tex.
[73] Assignee: Vestec Corporation, Houston, Tex.

[21] Appl. No.: 918,932
[22] Filed: Oct. 15, 1986
[51] Int. Cl.[4] ........................ B01D 59/44; H01J 49/26
[52] U.S. Cl. .................................... 250/292; 250/281; 250/282
[58] Field of Search ................... 250/281, 282, 288 R, 250/288 A, 290, 292, 293

[56] References Cited

U.S. PATENT DOCUMENTS

| | | | |
|---|---|---|---|
| 3,371,205 | 2/1968 | Berry | 250/292 |
| 3,793,063 | 2/1974 | Wiley | 250/293 |
| 4,234,791 | 11/1980 | Enke et al. | 250/281 |
| 4,377,745 | 3/1983 | Chang | 250/282 |
| 4,507,555 | 3/1985 | Chang | 250/281 |
| 4,536,652 | 8/1985 | Cooks et al. | 250/281 |

FOREIGN PATENT DOCUMENTS

| | | | |
|---|---|---|---|
| 0087743 | 5/1984 | Japan | 250/292 |

*Primary Examiner*—Bruce C. Anderson
*Assistant Examiner*—Paul A. Guss
*Attorney, Agent, or Firm*—Norvell & Associates

[57] ABSTRACT

Improved methods and apparatus suitable for use in mass spectrometry are provided for dissociating ions by achieving electronic excitation of the ions using electrons. In MS-MS applications, ion dissociation is induced by electron impact on an ion beam after the beam has exited a first mass analyzer, and before the beam enters a second analyzer. An efficient method for dissociating ions is achieved by providing a low velocity ion beam traveling substantially along the axis of an RF excited multipole field, and intersecting sheet electron beams traveling transverse to the axis of the field. When used in the analysis of high molecular weight, nonvolatile molecules, the teachings of the present invention yield the extensive and reproducible fragmentation characteristics generally associated with electron ionization of lower mass, volatile molecules. The methods and apparatus of the present invention may therefore be used in conjunction with mass spectrometry to qualitatively and quantitatively analyze a significantly greater quantity of samples. The techniques of the present invention are also well suited for dissociating high-mass, even-electron ions produced by thermospray and other soft ionization techniques.

20 Claims, 6 Drawing Figures

METHOD AND APPARATUS FOR DISSOCIATING IONS BY ELECTRON IMPACT

FIELD OF THE INVENTION

The present invention relates to ion fragmentation techniques and, more particularly, to ion dissociation techniques useful with mass spectrometry.

BACKGROUND OF THE INVENTION

A significant advantage of mass spectrometry is that both qualitative and quantitative data, not available from other analytical techniques, may be reliably obtained. In particular, mass spectrometry (MS) can provide molecular weight, empirical formula, isotope ratios, identification of functional groups, and elucidation of structure.

Historically, MS utilized electron ionization to produce a characteristic fragmentation pattern for an excited ion. Electron ionization (EI) techniques require that the molecule exist as a stable species in the gas phase, and thus the sample must have an appreciable equilibrium vapor pressure in some accessible temperature range. Approximately 80% of the known organic molecules are, however, either nonvolatile, not sufficiently volatile, or not sufficiently stable thermally to allow for the required vaporization. Accordingly, MS techniques were limited to analyzing relatively volatile substances which could be vaporized and ionized in the gas phase without being thermally decomposed.

Recent developments in ionization techniques involve the direct production of gas phase ions from condensed media, and often produce ions characteristic of the intact molecule. These relatively "soft" ionization techniques, such as thermospray, may provide ions characteristic of the intact molecule for many nonvolatile samples. These techniques, when used in conjunction with mass spectrometry, may be used for limited analysis of high molecular weight, nonvolatile, and thermally labile molecules. Thus, although these new ionization techniques have largely have overcome the EI volatile substance limitation, these techniques frequently fail to produce the stable, extensive reproducible fragmentation pattern required for acceptable structural elucidation. Thus, although these new developments have significantly expanded the applications of mass spectrometry, particularly to the life sciences, the poor dissociation efficiency and reproducibility of such high-mass ion fragmentation techniques has still substantially limited the acceptance and utilization of mass spectrometry.

Tandem MS-MS utilizing collisional dissociation techniques provide an acceptable method for yielding useful fragmentation in many cases. However, collision induced dissociation (CID) suffers from several difficiencies, particularly with respect to large, high mass molecules. Since CID causes dissociation by colliding the ions at relatively high kinetic energy with neutral gas molecules, high energy transfer is often accompanied by high momentum transfer, which in turn causes the higher energy portion of the excited ions to be scattered out of the beam. The excitation process which occurs is thus predominately due to internuclear collisions which lead to vibrational and rotational excitation, rather than electronic excitation. While some electronic excitation may occur in grazing collisions, a disproportionate fraction of this excitation energy may be lost, either with the electronic excitation energy of the neutral, or by photon emission. Since the maximum energy available decreases as the mass of the ion increases, CID is substantially ineffective for analyzing large molecules. Finally, fragmentation utilizing the CID process is not as easily reproducible as fragmentation utilizing electron ionization since the energy distribution depends on numerous parameters. Accordingly, tandem MS-MS techniques are also not well suited for analyzing large molecule samples, and have not been widely accepted for studies involving the life sciences. Additional information regarding CID techniques is disclosed in U.S. Pat. Nos. 4,234,791 and 4,536,652.

Lasers with the desired coverage of the UV spectrum for laser photodissociation are generally prohibitively expensive, and are rarely available. Thus, laser photodissociation also has not provided acceptable technology for enabling MS to fully analyze a wide range of samples.

The disadvantages of the prior art are overcome by the present invention, and improved methods and apparatus for use with mass spectrometry are hereinafter described for dissociating ions by electron impact. More particularly, new techniques are hereinafter disclosed for reliably obtaining predictable and reproducible fragmentation patterns from relatively stable, high molecular weight ions, thereby enabling structural information from large, nonvolatile molecules to be reliably obtained.

SUMMARY OF THE INVENTION

New methods and apparatus are provided for obtaining extensive, reproducible fragmentation of high-mass ions for utilization with mass spectrometry. Electron impact is used to excite the previously formed ions to electronic states above their dissociation limits. According to the present invention, a novel crossed-beam, high intensity electron-ion collision cell is employed to obtain sufficient electronic excitation of an ion beam. In one embodiment, a low energy ion beam travels along the axis of the quadrupole field, and electron emitters produce sheet electron beams traveling transverse to the axis of the field. The cell is suitably placed between two mass analyzers, the first analyzer being used to select a particular ion for dissociation, and the second analyzer being used for mass analyzing the fragments resulting from the dissociation.

The electron excitation cell of the present invention provides a relatively simple yet inexpensive device which may be reliably used in conjunction with commerically available MS-MS components for analyzing high molecular weight samples. The use of the intense electron beam drastically increases the dissociation efficiency over prior art techniques, while improving the reproducibility and thus the predictability of the results. The teachings of the present invention are also applicable to liquid chromatography/mass spectrometry (LC-MS) technology, and provide an important ingredient needed to render mass spectrometry fully available to researchers in the life sciences.

These and other features and advantages of the present invention will become apparent from the following detailed description, wherein reference is made to the figures in the accompanying drawings.

DETAILED DESCRIPTION OF THE PREFERRED EMBODIMENTS

Electron Impact Dissociation Theory

Figure 1A:
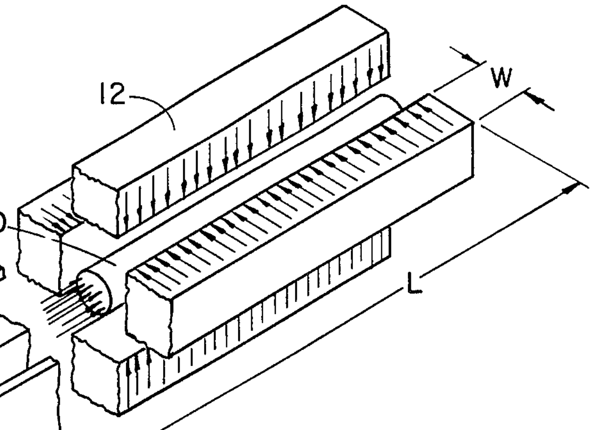
FIG. 1A is a simplified pictorial view of the basic electron impact dissociation technique for the apparatus depicted in FIG. 1, showing a cylindrical beam of ions and intersecting sheets of electrons.

Electron impact dissociation (EID) techniques according to the present invention have significant advantages compared to prior art electron impact (EI) techniques or collision induced dissociation (CID) techniques. To understand the principals of the present invention and its advantages over the prior art, this section compares the theory of EID to such prior art techniques, and provides the basis for the optimal arrangements subsequently disclosed for achieving the purposes of the present invention.

Electron impact (EI) phenomena on neutral molecules may be represented by $$e^{31}+M \rightarrow M^{*}+e^{-}$$

$$e^{31}+M \rightarrow (M^{+})^{*}+2e^{-}$$

$$(M^{+})^{*} \rightarrow \text{fragment ions}$$

where the * indicates an ion or neutral produced in an electronically excited state. In electron impact mass spectrometry, the excited ion decomposes to produce a characteristic fragmentation pattern. This fragmentation pattern depends on the internal energy distribution of the excited ions, which energy distribution in turn depends on the energy of the electrons and the temperature of the molecules prior to ionization. These dependencies are well understood and electron impact mass spectra are stable and reproducible. Libraries of mass spectra obtained under standard conditions are thus widely available for a large number of relatively volatile compounds. As previously stated, however, this prior art electron impact technology is, in practice, limited to analyzing low molecular weight, volatile samples.

Collision induced dissociation (CID) techniques utilizing tandem mass spectrometry may be represented $$M^{+}+N \rightarrow (M^{+})^{*}+N$$

$$(M^{+})^{*} \rightarrow \text{fragment ions}$$

Although the CID process gives useful fragmentation in many cases, the energy distribution and hence the fragmentation pattern are not as easily reproducible as results from the EI process. Also, sufficiently high energy inputs required to produce extensive fragmentation of the generally more stable, even-electron ions produced by soft ionization techniques, such as thermospray, are difficult to achieve without causing excessive ion scattering. Moreover, the CID process is practically ineffective for analyzing large molecule samples.

According to the teachings of the present invention, electrons are used to induce dissociation of ions. This electron impact dissociation (EID) process may be depicted by $$e^{-}+M^{+} \rightarrow (M^{+})^{*}+e^{-}$$

$$(M^{+})^{*} \rightarrow \text{fragment ions}$$

and $$e^{-}+M^{+} \rightarrow (M^{++})^{*}+2e^{-}$$

$$(M^{++})^{*} \rightarrow \text{fragment ions}$$

The EID process according to the present invention may also be used for dissociating negative ions, in which case the process may be depicted by $$e^{-}+M \rightarrow (M^{-})^{*}+e^{-}$$

$$(M^{-})^{*} \rightarrow \text{fragment ions}$$

In this case, however, the electron detachment process, represented by $$e^{-}+M^{-} \rightarrow M+2e^{-}$$

will cause loss of signal without leading directly to observable fragments. However, the produced molecules, M, can be reionized by ordinary electron impact.

Although the interaction of electrons with ions has not been studied as extensively as the interaction of electrons with neutrals, the fundamental processes are well understood and are very similar to the analogous processes involving neutrals. Although detailed data on the cross sections for these processes are not currently available, such cross sections should be somewhat higher than (due to the coulombic attraction) but otherwise similar to cross sections for the corresponding neutrals at low electron energies.

In general, it is known that the process rate, expressed in numbers per second, occurring as a result of binary collisions can be expressed as $$R=n_{1}n_{2}(dV)\,(A)\,(v)$$

where $n_1$ and $n_2$ are the number densities (number/cubic cm) of the colliding species, dV is the interaction volume (cubic cm), A is the cross section for the interaction (square cm) and v is the relative velocity (cm/sec).

EID in MS-MS

Although the concept of using an electron beam to induce dissociation of ions is not novel, the prior art fails to provide techniques for effectively obtaining this objective, particularly in the environment of mass spectrometry instrumentation. According to the present invention, various factors are considered in designing a practical system for dissociating ions by electron impact, and of primary significance are the following: First, electron emitters are limited by the maximum emission current densities which are practically obtainable, and the intensity of the electron beam is further restricted by space charge. Second, in order to obtain sufficient dissociation, the total electron current intersecting the ion beam should be large. Third, since the ion density, and therefore the ionization probability, is inversely proportional to ion velocity, a low ion velocity relative to the electron beam is desirable. Finally, the maximum ion density in a beam is normally significantly less than the neutral gas density (even in a good vacuum system), and therefore it is important to prevent ions produced by electron ionization of the background gas from reaching the ion detector, while maximizing the transmission of the ion fragments (daughter ions).

The present invention thus employs a long electron beam in the direction of ion travel, and low ion velocity. Assuming that an elongate cylindrical beam of ions traveling at a velocity $v_i$ intersects a sheet or wall of electrons, the density of the ion beam $D_i$ may be expressed $$D_i = I_i/\pi r^2 v_i$$

with r being the radius of the ion beam, and $I_i$ being the intensity of the ion beam.

Assuming that the electron beam has a length L and a width W, that electrons in the beam intersect the ion beam at a velocity $v_e$, and that the electron beam has an intensity $I_e$, the electron beam flux $F_e = I_e/LW$, and the electron beam density $n_e = F_e/v_e$. The width of the electron beam W is assumed to be equal to or greater than the diameter 2r of the ion beam. Accordingly, the differential interaction volume dV of the ion beam and the electron beam at a point x along the axis beam is equal to $\pi r^2(dx)$.

Since the velocity of the ion beam $v_e$ is so much greater than the velocity of the ion beam $v_i$, the relative velocity between these beams approximates the velocity of the electron beam. Accordingly, the rate of dissociation at any point along the axis of the ion beam (within the electron impact dissociation cell) may be expressed as follows:

$$-dI_i = dI\,(\text{Fragments}) = \frac{dn}{dt} = \frac{F_e}{v_e}\left(\frac{I_i}{\pi r^2 v_i}\right)(\pi r^2 dx) v_e A$$

and thus $$-\frac{dI_i}{I_i} = \frac{F_e A(dx)}{v_i}$$

Integrating over the length of the electron-ion interaction volume, L, gives $$I_i(\text{Exit}) = I_i(\text{Entrance})\; e^{-F_e AL/v_i}$$

and total fragment ion intensity is given by $$I(\text{Fragments}) = I_i(\text{Entrance}) - I_i(\text{Exit})$$

Thus the fraction of the incident ion beam dissociated in the electron induced dissociation cell is $$\frac{I\,(\text{Fragments})}{I_i\,(\text{Entrance})} = 1 - e^{-F_e AL/v_i}$$

In the case in which $F_e AL/v_i$ is much less than unity, this reduces approximately to the following:

$$\frac{I\,(\text{Fragments})}{I\,(\text{Entrance})} = \frac{F_e AL}{v_i}$$

In the environment of a cylindrical beam of ions intersecting a sheet of ions, the fraction of the ion beam dissociated by electron impact is thus dependent on the product of the electron flux density multiplied by the interaction volume (the length of the electron beam and the cross section for the electron impact dissociation), with that product divided by the velocity of the ion beam.

The electron impact dissociation (EID) technique of the present invention is well suited for use in MS-MS applications, wherein the desired dissociation occurs after initial mass analysis of the primary ion beam, i.e., between the first and second analyzers. The first mass analyzer is used to select the primary ions (parent ions) for study, and the second mass analyzer is used to determine the masses of the secondary ions (daughter ions). Since the RF quadrupole design effectively transmits ions with low kinetic energies, this design marries well with the concepts of the present invention. Using the RF only quadrupole design as a dissociation cell, all ions above a certain mass are transmitted efficiently, even though the ions may have both relatively low velocities along the axis of the quadrupole and significant transverse velocity components. Thus, the RF only design inherently acts as a filter to chop off low mass ions while allowing the passage of ions above a certain minimum mass.

Applying the above EID concepts to a MS-MS application utilizing a quadrupole field, the electron emitters are preferably arranged to produce sheet electron beams traveling traverse to the axis of the multipole field, with a low energy ion beam traveling substantially along the axis of the RF excited field. Thus, a quadrupole interaction cell may be utilized to transmit and confine the ions, with sheet electron beams formed between the quadrupole rods to provide the desired dissociation.

Figure 1:
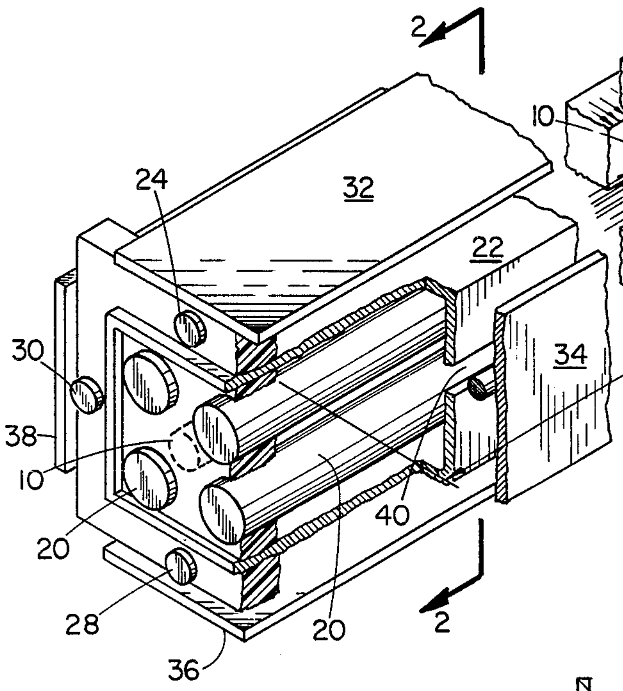
FIG. 1 is a simplified pictorial view of a portion of suitable apparatus according to the present invention for dissociating ions by electron impact.
Figure 2:
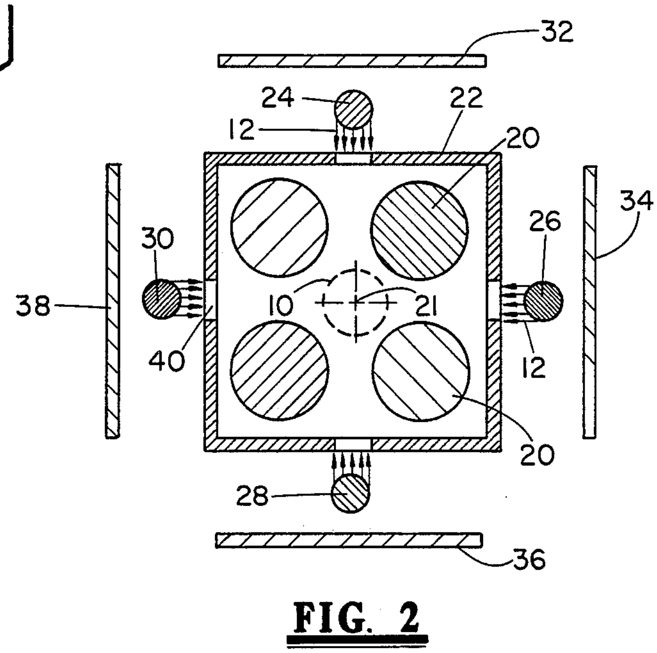
FIG. 2 is a cross-sectional view of the apparatus shown in FIG. 1.

A schematic diagram of an interaction cell in a quadrupole field is shown in FIG. 1, and the electron impact dissociation concept of this invention for such apparatus is depicted in FIG. 1A. FIG. 2 is a cross-sectional view of the apparatus shown in FIG. 1, and depicts four electron emitters for forming "sheets" of electrons, and the generally cylindrical ion beam 10. Conventional cylindrical quadrupole electrodes or rods 20 are positioned within a quadrupole shield 22.

The rods 20 are each aligned with and together are positioned symmetrically about a central multipole axis 21. For clarity of illustration, a portion of the supporting structure, the terminating lenses, and the vacuum enclosure are omitted from FIGS. 1 and 2. Opposite pairs of rods 20 are conventionally interconnected electrically and brought out to suitable terminals. In operation, RF voltage is applied across the terminals, and a stream of ions is directed along the axis 21. Only ions with mass to charge ratio greater than the minimum value pass through the quadrupole, with the lower mass ions following unstable trajectories leading to escape from the quadrupole field. These remaining ions impact on the quardupole rods 20 or shield 22 and are neutralized.

Electron emitter filaments 24, 26, 28 and 30 are positioned between the rectangular quadrupole shield 22 and filament shields 32, 34, 36 and 38, respectively. Shield 22 prevents most of the primary electrons from striking the quadrupole rods, and shields 24, 26, 28 and 30 function to keep electrons or ions from traveling to the vacuum housing walls (not depicted in FIGS. 1 and 2). Slots 40 are provided in planar plates of the quadrupole shield 22 for allowing the electron beams 12 to pass by the quadrupole shield 22 and between the quadrupole rods 20. The electron emitter filaments are mounted in conventional fashion and are kept taut even when heated. The electron emitter filaments are positioned with respect to slots 40 to produce the desired electron beams between the rods. Beam focusing electrodes (not depicted) may also be supplied to more sufficiently form and transmit the beams 12.

The quadrupole rods 20 shown in FIGS. 1 and 2 may thus suitably be RF only quadrupole rods similar to those used in conventional MS-MS arrangments with a collision induced dissociation technique. According to the present invention and contrary to such CID techniques, however, the electron emitting filaments 24, 26, 28 and 30 produce "sheet" electron beams between the quadrupole rods which intersect the inner cylindrical beam. It is believed that at least 20% of a 10 eV beam of 1,000 amu ions should be dissociated as the ions travel through the cell depicted in FIGS. 1 and 2.

As previously noted, the efficiency of the technique of the present invention increases rather than decreases with increasing ion mass. The apparatus as shown in FIGS. 1 and 2 may thus be used to provide qualitative and quantitative data regarding various samples, including high-mass samples. In addition to obtaining data regarding molecular weight, isotope ratios, and identification of functional groups, data can be obtained regarding empirical formulas (using precise mass measurement techniques) and the elucidation of stereochemical features.

Figure 5:
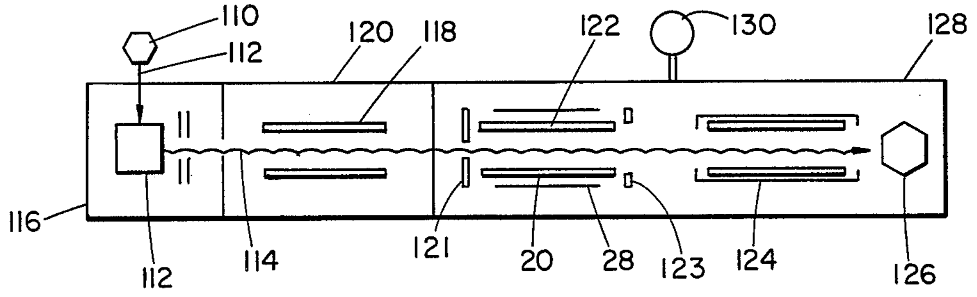
FIG. 5 is a schematic representation of a tandem quadrupole mass spectrometer for selected ion fragmentation in accordance with the present invention.

FIG. 5 depicts a tandem quadrupole mass spectrometer utilizing the electron impact ionization technique of the present invention for producing the predictible fragmentation patterns suitable for structural elucidation. An unknown sample 110 is fed to a conventional electron impact ion source 40 via tube 42. Each section 116, 120 and 128 of the apparatus depicted in FIG. 5 is supplied with a suitable vacuum pump, although for simplicity only pump 130 for section 128 is shown.

The output ion beam 114 from section 116 is input to a first conventional quadrupole mass analyzer 128 within section 120. The first analyzer 118 serves to scan and select the primary ions for study. The selected primary ions may be ionized sample molecules, fragments or derivatives thereof of a particular mass over a range of atomic mass units.

The final section 128 of the mass spectrometer includes the electron impact ionization cell 122 according to the present invention, a second analyzer 124, and detector 128. After the ions have been excited to electronic states above their dissociation limits by cell 122, the beam 114 continues to the second quadrupole analyzer for scanning over a range of atomic mass units and selecting ions of a particular mass. The detector 126 at the output of analyzer 124 then produces a representation of a mass spectrum for identifying the sample 110. The detector according to the present invention may be of any type used in MS, such as a Faraday cup or an electron multiplier.

Some of the ions produced by ionization of the neutral gas may escape from the quadrupole especially those from the higher mass components. Since these ions are produced from a neutral vapor which has only thermal energies, their translational energies will generally be significantly lower than those produced by dissociation of the ion beam. By placing a retarding or terminating lens at the end of the quadrupole, it should be possible to entirely (or at least substantially) prohibit these low energy ions from exiting the cell without significantly affecting the transmission of the ions of interest.

FIG. 5 also depicts standard terminating lenses provided at the ends of the quadrupole cell to minimize or entirely prohibit ions or electrons produced from the neutral gas from exiting the cell. Entrance lens 121 has a small diameter circular aperture, while exit lense 123 has a large diameter circular aperture slightly less than the distance between opposite pairs of rods 20. Although the beam 10 naturally increases in diameter as it travels along the cell, the entrance aperture is sized so that the beam is always contained within the inner space between the quadrupole rods. The terminating lenses each comprise a metal electrode plate positioned at the ends of the rods 20 with a central aperture of a desired diameter, and with the plate biased electrically to prevent low energy ions from leaving the cell.

Conventional means may also be utilized for suppressing photons and excited neutrals formed in a cell, and preventing them from reaching the detector. An off axis arrangement for accomplishing this objective and thereby minimizing noise is well known in the prior art. Also, some means of dissipating excess heat may be required, such as water cooled jackets.

Although FIGS. 1 and 2 clearly depict a practical quadrupole field, any even number of poles larger than four could be utilized. Also, although four heated filaments or other sources of electrons are preferably used with the quadrupole field to produce sheet electron beams transmitted through each of the gaps between the quadrupole rods, more or less electron sources could be used.

ALTERNATE EMBODIMENTS

In the embodiment described above, the electron beams may be undesirably deflected as they pass between the quadrupole rods. This deflection will be largest for those electrons which reach this point, between the quadrupole rods, when the RF amplitude to the rods is at its maximum. So long as the electron energy is high compared to the amplitude of the RF excitation, the deflection of the electron beams should not present a problem. Typically, the RF quadrupole may operate at an amplitude of approximately 100 volts and in the 1 Megahertz frequency range. These conditions are generally satisfactory (for typical quadrupole geometries) to efficiently transmit the higher masses of interest while rejecting the lower mass ions produced by ionization of the residual gas. In a typical vacuum system, the residual gas primarily consists of water, air (principally nitrogen, oxygen, argon, and carbon dioxide), hydrogen, helium, and other low mass constituents. Some higher mass contaminants may also be present, for example, from pump oil vapor.

In order to reduce deflection of the electron beam, a conventional 600 volt electron accelerator may be used. Also, the width of slots 40 may be narrowed so that the width of the electron beam, including that introduced by deflection, is less than the distance betwen adjacent quadrupole rods. Preferably, the width of the slot 40 in the quadrupole shield 22 is approximately one-half the width of the space between the quadrupole rods through which the electron sheets pass. Under these conditions, all of the primary electrons should traverse the cell without striking the rods 26, and will either be collected on the opposite filament shield or be reflected back toward their emitting filament for an additional pass. Thus, the electron beam is broadened slightly due to deflection by the RF field, but this should not generally present a significant problem.

Figure 3:
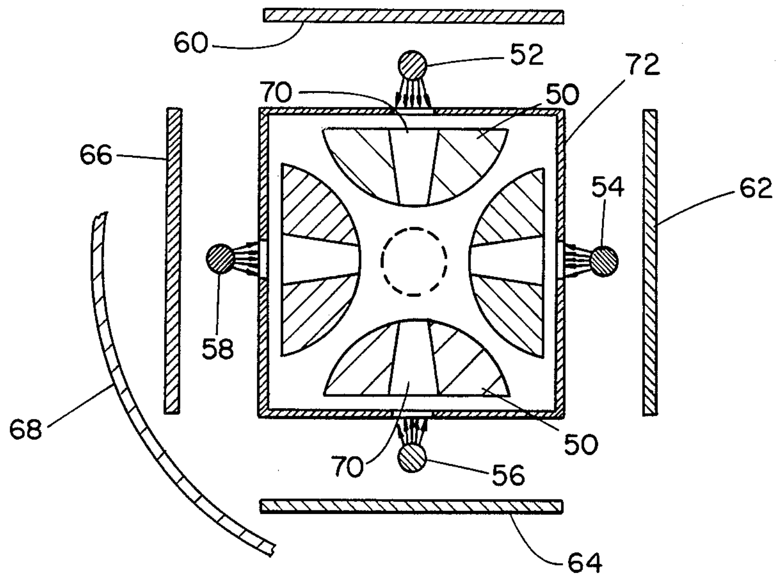
FIG. 3 is a schematic diagram of an alternate embodiment of the apparatus shown in FIG. 2.

FIG. 3 discloses an alternate embodiment of the present invention, wherein the conventional cylindrical quadrupole rods are replaced with hyperbolic rods 50 (or an approximation thereto), each having a slot 70 in the center for transmitting the electron beam from the emitter rods 52, 54, 56 and 58. This embodiment removes the above-described deflection effect, since the electron energy is merely modulated by the RF field. Shields 60, 62, 64 and 66 serve the purpose of the filament shields shown in FIG. 2, and the lower mass ions produced by ionization of the residual gas. In a typical vacuum system, the residual gas primarily consists of water, air (principally nitrogen, oxygen, argon, and carbon dioxide), hydrogen, helium, and other low mass constituents. Some higher mass contaminants may also be present, for example, from pump oil vapor.

In order to reduce deflection of the electron beam, a conventional 600 volt electron accelerator may be used. Also, the width of slots 40 may be narrowed so that the width at the electron beam, including that introduced by deflection, is less than the distance betwen adjacent quadrupole rods. Preferably, the width of the slot 40 in the quadrupole shield 22 is approximately one-half the width of the space between the quadrupole rods through which the electron sheets pass. Under these conditions, all of the primary electrons should traverse the cell without striking the rods 26, and will either be collected on the opposite filament shield or be reflected back toward their emitting filament for an additional pass. Thus, the electron beam is broadened slightly due to deflection by the RF field, but this should not generally present a significant problem.

FIG. 3 discloses an alternate embodiment of the present invention, wherein the conventional cylindrical quadrupole rods are replaced with hyperbolic rods 50 (or an approximation thereto), each having a slot 70 in the center for transmitting the electron beam from the emitter rods 52, 54, 56 and 58. This embodiment removes the above-described deflection effect, since the electron energy is merely modulated by the RF field. Shields 60, 62, 64 and 66 serve the purpose of the filament shields shown in FIG. 2, and quadrupole shield 72 is similar to shield 22. Suitable "rods" may also consist of simple plates formed in a hyperbolic shape, with each plate having a suitable central slot for transmitting the electron beam. FIG. 3 also depicts a portion of the cylindrical vacuum housing wall 68.

It should be understood that the electron induced dissociation techniques of the present invention may also be used between an ion source and a single mass analyzer to cause ions to fragment before mass analysis. This operating mode would be particularly useful when a relatively pure sample was introduced to the ion source. Thus, when used with prepurified samples or in LC-MS equipment in which the ion sources produce little fragmentation (soft ionization sources, such as thermospray), the electron induced dissociation techniques of the present invention could be used between the ion source and a single mass analyzer. Such an alternative multipole ion/electron collision cell within the concept of the present invention should enable the primary ions and their fragments within the incident ion beam to be efficiently transmitted, but ions produced by electron impact ionization of the residual gas of neutral molecules would not be transmitted.

Figure 4:
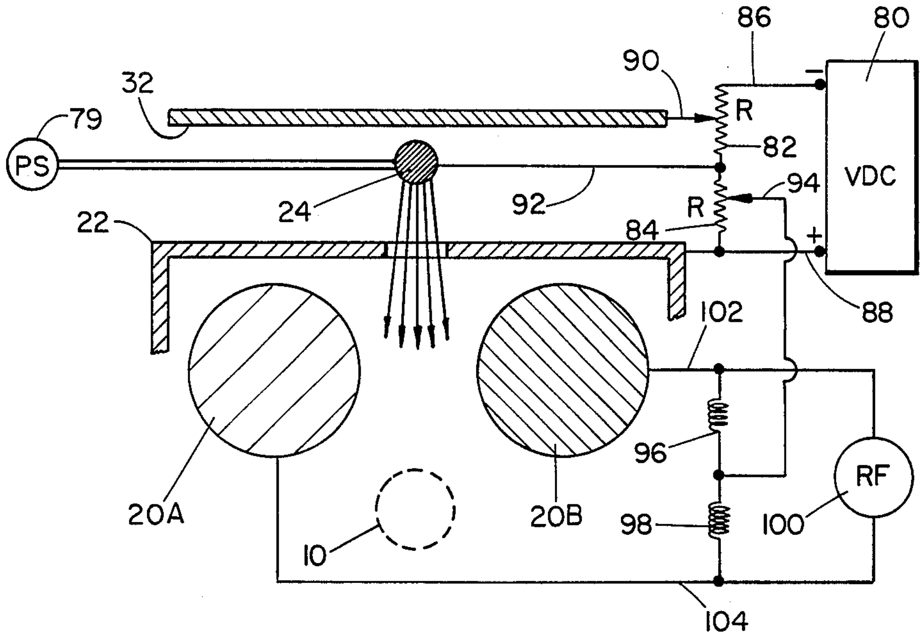
FIG. 4 is a simplified electrical diagram for the apparatus shown in FIGS. 1 and 2.

FIG. 4 discloses a portion of the apparatus depicted in FIG. 1 with a suitable power supply and electronics arrangement for both the electron emitters and the quadrupole rods. A conventional power supply 79 is required to heat the electron emitting rods by passing an electrical current through them. A power supply capable of delivering 30 amps at 30 volts should be suitable for this purpose, and a somewhat smaller power supply should be satisfactory in some applications. Another DC power supply 80 is provided for biasing each of the emitters, e.g. rod 24, while negatively charging the filament shield 32 via line 88 and positively charging the quadrupole shield 22. Variable resistors 82 and 84 are connected in series with the power supply 80, and line 92 connected between the pair of resistors is provided for driving the emitter 24. The filament shield 32 may be directly connected to the negative side of the power supply 80 via line 86. Alternatively, the negative bias to filament shield 32 may be adjusted via line 90 and variable resistor 82, as shown in FIG. 4. A suitable direct current power supply 80 is a 1 amp, 600 to 1,000 volt power source.

An RF supply 100 is provided for powering the quadrupole rods, including rods 20A and 20B shown in FIG. 4. A suitable RF supply operates at a frequency of approximately 1 Megahertz, and a voltage of approximately 100 volts. RF supply 100 is a highly tuned circuit, which supplies a high voltage, low current to the quadrupole rods. The RF power supply 100 may be similar to the RF power supply for either of the mass analyzers described in U.S. Pat. No. 4,234,791, hereby incorporated by reference. Inductors 96 and 98 are each in series with the variable output from resistor 84 via line 94.

Most of the ions and secondary electrons produced by electron ionization of the residual gas will be collected on the quadrupole rods. Under typical operating conditions, the vacuum pumps should reduce the residual gas pressure to approximately one billionth of an atmosphere or less. At this pressure, the current produced by ionizing the residual gas will typically be a few microamperes or less. The RF power supply 100 (FIG. 4) will supply these RF currents while still permitting a sufficiently high RF voltage to efficently transmit the ions of interest along the axis 21. Under some conditions, for example when the EID cell of the present invention is used as a fragmentation means with LC-MS, the residual gas pressure may be substantially higher. In this latter case, a larger RF supply will thus be required to supply proportionally higher currents.

While in a preferred embodiment the EID cell may operate in the RF-only mode, varying degrees of mass filtering may be introduced in the fragmentation quadrupole, such as adding DC bias, without departing from the invention. Also, while the concept of the present invention is most advantageously employed in combination with a quadrupole mass filter, other types of mass filters or analyzers may be employed as well. To the extent that the ion energies required for proper operation of various components are incompatible, known electrostatic lenses may be employed to slow down or speed up the ions as required.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A mass spectrometer for the analysis of samples, including ionizing means for ionizing sample molecules of widely varying molecular weights to produce ions derived from the sample, fragmentation means for producing ionized fragments or products of the produced ions, mass analyzer means for scanning the ionized fragments or products and selecting ionized fragments or products of a particular weight over a wide range of atomic mass units, and detector means at the output of the mass analyzer means for receiving the selected ionized fragments or products and for producing a representation therefrom of a mass spectrum for identifying the sample or components thereof, the fragmentation means comprising:

a first plurality of electrically conducting rods for forming a multipole electrodynamic field having a central axis and for transmitting a substantially cylindrical-shaped elongate beam of the produced ions from the ionizing means to the mass analyzer means along substantially the central axis;

a second plurality of electrically conducting rods each spaced radially outwardly from the first plurality of electrically conducting rods with respect to the central axis for passing electrons from the second plurality of electrically conducting rods toward the central axis; and shielding means spaced radially between the second plurality of electrically conducting rods and the first plurality of electrically conducting rods for prohibiting electrons passing from the second plurality of electrically conducting rods toward the central axis from engaging the first plurality of electrically conducting rods and transmitting radially inward past the first plurality of electrically conducting rods elongate sheets of electrons for intersecting the elongate beam of produced ions so as to excite at least some of the produced ions to electronic states above their dissociation limits and producing the ionized fragments or products.

2. A mass spectrometer as defined in claim 1, wherein the mass analyzer means is a quadrupole-type analyzer, and the first plurality of electrically conducting rods comprises four electrically conducting rods for forming a quadrupole electrodynamic field.

3. A mass spectrometer as defined in claim 2, wherein the second plurality of electrically conducting rods comprises four electrically conducting rods each producing a sheet of electrons passing between two of the first plurality of electronically conducting rods.

4. A mass spectrometer as defined in claim 1, further comprising:

another mass analyzer spaced between the ionizing means and the fragmentation means for scanning the produced ions and selecting ions of a particular mass over a range of atomic mass units for transmitting to the fragmentation means.

5. A mass spectrometer as defined in claim 1, further comprising:

entrance lens means for restricting the width of the ion beam entering the multipole electrodynamic field;

exit lens means for restricting the width of the ion beam exiting the multipole electrodynamic field; and wherein each of the second plurality of electrically conducting rods is rotationally spaced approximately equally between two of the first plurality of electrically conducting rods.

6. A mass spectrometer as recited in claim 1, further comprising:

an RF power source connected to the first plurality of electron rods for producing an RF-only electrodynamic field.

7. A mass spectrometer as defined in claim 1, wherein each of the first and second plurality of electrically conducting rods is axially parallel with the central axis of the electrodynamic field and each of the sheets of electrons intersects the beam of produced ions at substantially a right angle.

8. A mass spectrometer as defined in claim 1, wherein the shielding means includes an elongate slot within a substantially planar plate portion and having a slot width substantially equal to or less than half of a spacing between two of the first plurality of electron rods for transmitting a sheet of electrons inwardly past the two of the first plurality of electron rods.

9. A mass spectrometer as defined in claim 1, wherein each of the first plurality of electron rods has an intermediate slot for transmitting the elongate sheets of electrons past the first plurality of electrically conducting rods.

10. A mass spectrometer as defined in claim 9, wherein an inner surface of each of the plurality of electron rods has a generally hyperbolic configuration.

11. A method for analyzing an unknown sample by a mass spectroscopy, comprising the steps of:

ionizing sample molecules of widely varying molecular weights to produce ions derived from components of the sample;

forming a multipole electrodynamic field having a central axis located between multipole electrically conductive rods for transmitting a substantially cylindrical-shaped elongate beam of the produced ions along substantially the central axis;

forming sheets of electrons for transmitting electrons radially inwardly toward said central axis to intersect the elongate beam of produced ions so as to excite at least some of the produced ions to electronic states above their dissociation limits for producing ionized fragments or products;

mass scanning the produced ionized fragments or products and selecting ionized fragments or products at teach of various selected atomic masses; and detecting the selected ionized fragments or products at each of the various selected atomic masses and producing a representation of a mass spectrum to identify the components of the sample.

12. A method as defined in claim 11, further comprising:

mass scanning the produced ions before producing ionized fragments or products to select ions of a particular atomic mass over a range of atomic mass units at different times.

13. A method as defined in claim 11, further comprising:

restricting the width of the electron beam entering the multipole electrodynamic field to maintain the ion beam while within the multipole electrodynamic field between the multipole electrically conducting rods.

14. A method as defined in claim 11, wherein the multipole electrodynamic field is formed by powering quadrupole rods from an RF power source for producing an RF-only quadrupole field.

15. A method as defined in claim 11, wherein each of the sheets of electrons intersect the beam of produced ions at substantially a right angle.

16. A method as defined in claim 11, further comprising:

providing shielding means for restricting the width of the electron sheets to inhibit electrons from engaging the multipole electrically conducting rods used for forming the electrodynamic field as the electrons are transmitted inwardly past the electrically conducting rods.

17. A method as defined in claim 11, wherein the multipole electrodynamic field is formed from a plurality of electrically conducting rods each having an intermediate slot for transmitting one of the elongate sheets of electrons inwardly past the electrically conducting rods.

18. A method of analyzing a sample by mass spectroscopy, comprising the steps of:

(1) ionizing sample molecules to produce ions derived from components of the sample;

(2) directing the produced ions in a beam through a fragmentation cell at a relatively low ion velocity;

(3) producing electrons for transmitting to the ion beam within the fragmentation cell;

(4) directing the produced electrons radially inward in one or more substantially elongate sheets for intersecting the ion beam at substantially a right angle, so as to excite at least some of the produced ions in the beam to electronic states above their dissociation limits for producing ionized fragments or products;

(5) mass scanning the ionized fragments or products produced in step (4) and selecting ionized fragments or products of a particular weight; and (6) detecting the ionized fragments or products selected in step (5) to produce a representation of a mass spectrum for comparison with reference spectra to identify the components of the sample.

19. The method as defined in claim 18, further comprising:

mass scanning the ions produced in step (1) and selecting ions of a particular mass over a range of atomic mass units at different times.

20. A method as defined in claim 18, wherein step (2) comprises:

forming a quadrupole electrodynamic RF-only field having a central axis; and wherein the beam of produced ions is directed along substantially the central axis.

* * * * *